United States Patent
Takagi et al.

[11] Patent Number: 5,937,965
[45] Date of Patent: Aug. 17, 1999

[54] VEHICLE LOAD RESPONSIVE POWER STEERING SYSTEM

[75] Inventors: Hiroshi Takagi, Tokyo; Shinichi Hagidaira; Satoshi Yasunaga, both of Kani, all of Japan

[73] Assignees: Mitsubishi Jidosha Kogyo Kabushiki Kaisha; Kayaba Kogyo Kabushiki Kaisha, both of Tokyo, Japan

[21] Appl. No.: 08/750,112

[22] PCT Filed: May 15, 1996

[86] PCT No.: PCT/JP96/01269

§ 371 Date: Nov. 26, 1996

§ 102(e) Date: Nov. 26, 1996

[87] PCT Pub. No.: WO96/36521

PCT Pub. Date: Nov. 21, 1996

[30] Foreign Application Priority Data

May 16, 1995 [JP] Japan ................................. 7-116758

[51] Int. Cl.⁶ ...................................................... B62D 5/06
[52] U.S. Cl. ........................... 180/422; 180/421; 180/446
[58] Field of Search ..................................... 180/415, 421, 180/422, 443, 446, 441; 701/41–44

[56] References Cited

U.S. PATENT DOCUMENTS

| | | | |
|---|---|---|---|
| 4,212,366 | 7/1980 | Ohtuka et al. | 180/441 |
| 4,216,841 | 8/1980 | Ohtuka et al. | 180/422 |
| 4,602,695 | 7/1986 | Takeshima et al. | 180/446 |
| 4,637,483 | 1/1987 | Eto et al. | 180/422 |
| 4,828,066 | 5/1989 | Hayashi | 180/446 |
| 4,926,960 | 5/1990 | Ishikura et al. | 180/446 |
| 5,072,803 | 12/1991 | Kilian et al. | 180/422 |
| 5,430,650 | 7/1995 | Susuki et al. | 180/415 |

FOREIGN PATENT DOCUMENTS

| | | |
|---|---|---|
| 314672 | 4/1985 | Japan . |
| 60-151180 | 8/1985 | Japan . |
| 4-349074 | 12/1992 | Japan . |
| 6-115443 | 4/1994 | Japan . |

*Primary Examiner*—Lanna Mai
*Assistant Examiner*—Michael Cuff

[57] ABSTRACT

Timer action is done from the time point $t_1$, where the detected vehicle speed determined by the vehicle speed signal $S_2$ is 0, until the time point $t_6$, where the detected vehicle speed exceeds 0, thereby determining the timer time T. The value of the axle load signal $S_1$ is transiently held, beginning at the time point $t_2$ where the period of time X has passed since $t_1$. When the timer time T is longer than the set timer time $T_0$, the value of the axle load signal $S_1$ at the time point $t_5$, the point chronologically backward by the period of time Y from $t_6$, is read. Based on this read value, the opening of the control valve is adjusted to vary the assist force. Thus, even when a vibration occurs in the vehicle body during driving, the assist force by the power steering system is made constant, whereby a feeling during steering can be improved.

17 Claims, 5 Drawing Sheets

VEHICLE LOAD RESPONSIVE POWER STEERING SYSTEM

TECHNICAL FIELD

This invention relates to a vehicle load responsive power steering system, which is designed to impart an improved feeling in steering the steering wheel.

BACKGROUND ART

Some automobiles have a power steering system so as to ensure a smooth operation (rotation) of the steering wheel. A power steering system gives assistance such that a pressurized oil produced in an oil pump is sent to a power cylinder via a control valve, and a steering operation is smoothed by an assist force generated in the power cylinder. A power steering system of the type controlling this assist force variably is also known widely. Common practice for controlling the assist force is to adjust the opening of the control valve, thereby adjusting the flow rate or pressure of pressure oil which is sent to the power cylinder.

Generally, a vehicle speed is used as a control parameter, but a vehicle load may be used as an alternative parameter. With such a vehicle load, vehicle speed responsive power steering system, as vehicle speed increases, or axle load (load on each wheel) decreases, it is recommendable to adjust the control valve so as to lower the flow rate or pressure of pressure oil, thereby lowering the assist force. As vehicle speed decreases, or as axle load increases, on the other hand, it is recommendable to adjust the control valve so as to raise the flow rate or pressure of pressure oil, thereby raising the assist force.

An example of a vehicle load, vehicle speed responsive power steering system may have a structure as shown in FIG. 1. As illustrated in FIG. 1, a suspension 1 of a truck comprises a leaf spring 2, a shock absorber 3, an axle (not shown), a frame 4, and a U-bolt 5.

An axle load sensor 10 takes an arm-like shape, one end thereof being rotatably mounted on the frame 4, and the other end being mounted on the axle. The axle load sensor 10 detects displacement between the frame 4 and the front axle, generating an axle load signal $S_1$ of a value corresponding to the detected displacement.

A vehicle speed sensor 11, on the other hand, produces a vehicle speed signal $S_2$, a pulse signal indicating a vehicle speed.

A controller 12 adjusts the opening of a control valve 13 so that an optimum steering operation can be performed in response to an axle load determined by multiplying the value of the axle load signal $S_1$ by the spring constant of the suspension, and a vehicle speed determined by the vehicle speed signal $S_2$ (detected vehicle speed). The opening of the control valve 13 has been set in response to a combination of each axle load and each vehicle speed. The numeral 14 denotes a steering wheel.

Such a vehicle load, vehicle speed responsive power steering system poses the following problem when adjusting the control valve in a one-to-one relationship with a change in axle load: If the automobile is running on a rough road, or is passing over a difference in road level, the value of the detected axle load varies because of vehicle body vibrations, even when cargo load is the same. Thus, the opening of the control value 13 is sequentially adjusted, and the assist force fluctuates.

In FIG. 5, F represents the value of an axle load, and f represents an operating force for the steering wheel 14. $F_0$ represents an axle load at the standstill of the automobile. As shown in this drawing, even when the cargo load is the same, the value of the detected axle load varies because of vehicle body vibrations. Thus, the operating force for the steering wheel 14 fluctuates while the vehicle is running. A steering feeling becomes even worse.

A conventional example paying attention to the above-described problem is present in Japanese Patent Publication No. 14672/91. The gist of this conventional example is a method for controlling a power steering system which adjusts a steering force by controlling an oil flow rate in response to a vehicle speed, the method comprising increasing an oil flow rate when an apparent average load at predetermined time intervals determined by changes in the vehicle height is large, and decreasing an oil flow rate when this average load is small.

With this conventional example disclosed in Japanese Patent Publication No. 14672/91, control is performed in response to the apparent average load at predetermined time intervals. Even in this case, the average load, consequently the assist force, varies delicately depending on the driving conditions. Thus, the aforementioned problem cannot be fully solved.

Fluctuations may be suppressed by setting a long predetermined period of time for calculating the average load. In this case, responses to changes in the cargo or the number of passengers become extremely poor.

The present invention has been accomplished in the light of the above-described problems. The invention aims at providing a vehicle load responsive power steering system having a steering feeling improved by making adjustment only when the actual cargo load varies in adjusting the steering assist force in response to changes in the vehicle load.

DISCLOSURE OF INVENTION

To attain the above object, the present invention sets a first set time and a second set time shorter than the first set time, stores and holds a detection output from a load detection means; and when sensing the start of a vehicle more than the first set time after detecting a standstill of the vehicle, controls the action of adjustment means for adjusting a steering assist force on the basis of a grounding load detection output present at the second set time (the second set time is shorter than the first set time) prior to the time point of the sensing of start of the vehicle.

By so doing, appropriate control can be made based on a grounding load after cargo load varies at a standstill of the vehicle, and an influence from vibrations immediately before restart can be prevented. A change in the assist force due to vibrations of the vehicle body during driving can also be prevented.

As noted above, the present invention constructs a control means of a vehicle load responsive power steering system such that the control means stores and holds a detection output from the load detection means; and when sensing the start of a vehicle, based on the detection output of a vehicle state detection means, more than the first set time after detecting a standstill of the vehicle based on the detection output of the vehicle state detection means, the control means controls the action of adjustment means for adjusting a steering assist force on the basis of a grounding load detection output present at the second set time (the second set time is shorter than the first set time) prior to the time point of the sensing of start of the vehicle.

The present invention is effectively applied to a truck with a great change in cargo load, but is applicable to a bus and a passenger automobile. The invention is also usable as a hydraulic power steering system or as an electric power steering system.

As the load detection means, an axle load sensor detecting the load on the steering wheel shaft is preferred because of its cost. However, a sensor which directly detects the grounding load on the wheel may be used.

The control means is preferably constructed such that when sensing the start of the vehicle after the vehicle has been judged to be at a stable standstill on the basis of the detection output of the vehicle state detection means, the control means controls the action of the adjustment means on the basis of a grounding load detection output present a predetermined time prior to the time point of the sensing of start of the vehicle. In this case, possible influence from vibrations of the vehicle body immediately after stoppage of the vehicle can be excluded.

The judgment as the stable standstill is effectively made at a time when the vehicle is at a standstill for more than a third set time shorter than the first set time. A specific example is the time when the state of no vehicle speed continues for more than the third set time, or when the state of no vehicle speed and the active state of a parking brake continue for more than the third set time.

BEST MODE FOR CARRYING OUT THE INVENTION

Embodiments of the present invention will now be described with reference to the drawings.

Figure 1:
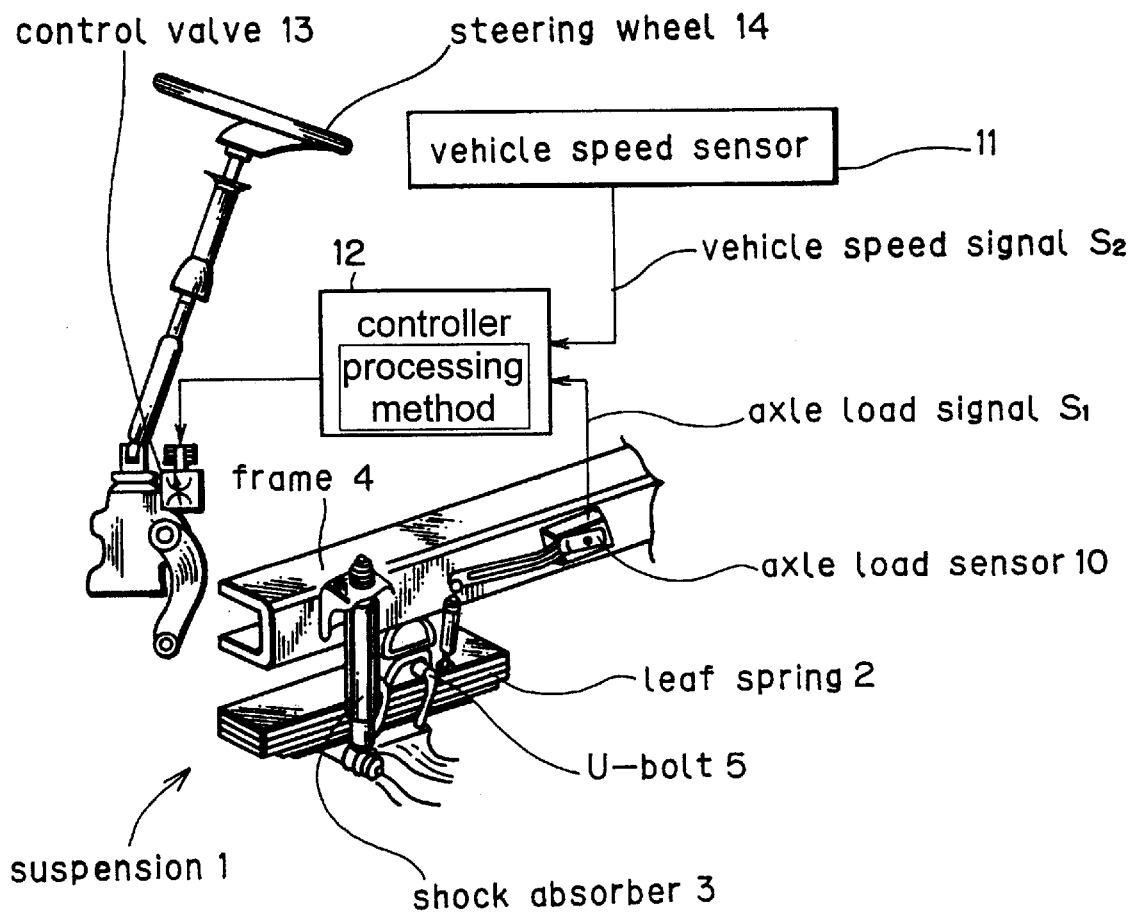
FIG. 1 is a constructional view showing a first embodiment of the present invention.
Figure 2:
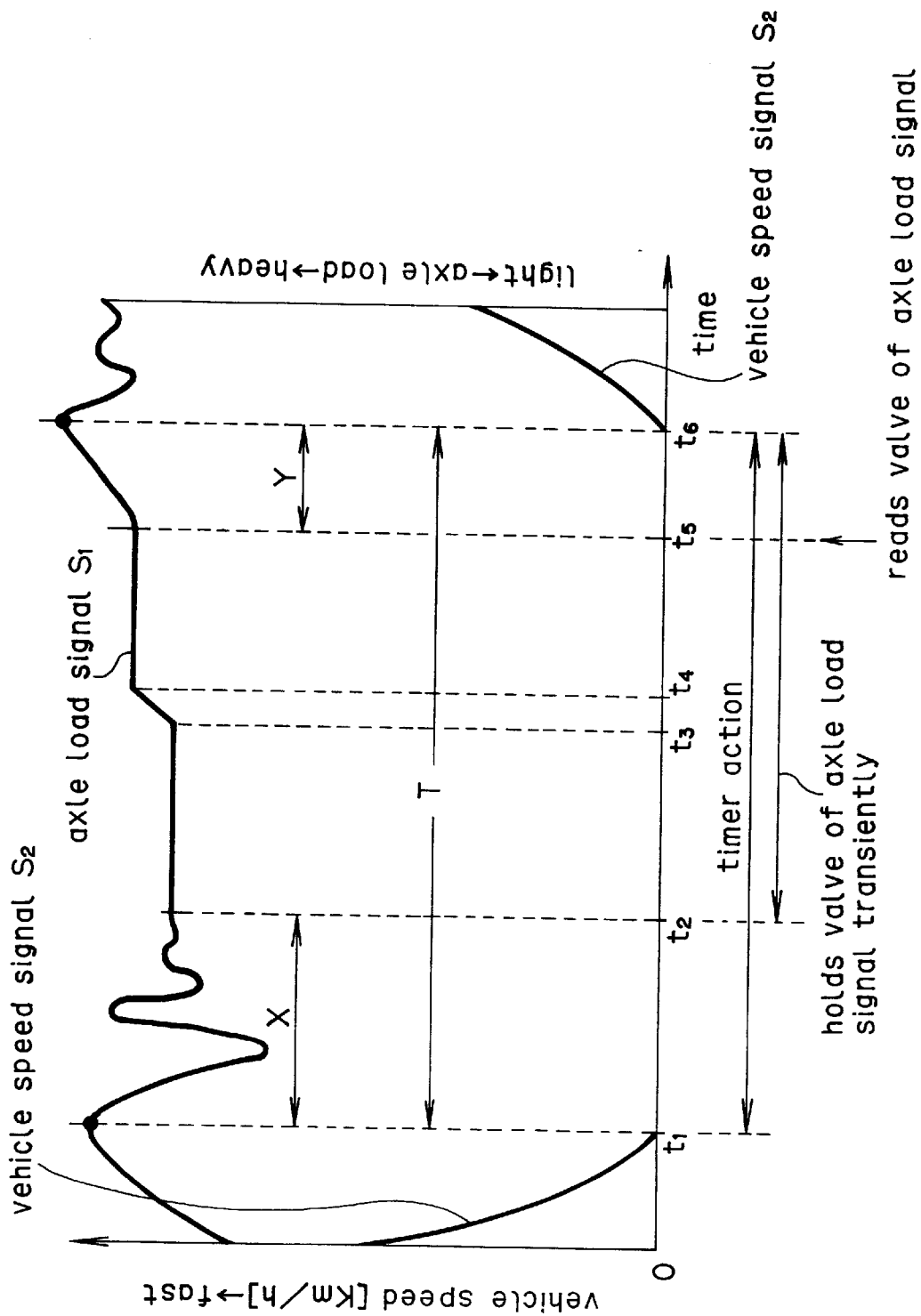
FIG. 2 is an explanatory view showing the state of action of the first embodiment.

The mechanical makeup of the first embodiment of the present invention is the same as shown in FIG. 1, and differs from the prior art only in the processing method of the controller 12. Thus, the first embodiment will be described with emphasis on the processing method of the first embodiment by reference to FIG. 1 and FIG. 2.

The controller 12 as a control means monitors an axle load signal $S_1$ to be entered from the axle load sensor 10 as a load detection means, and a vehicle speed signal $S_2$ to be entered from the vehicle speed sensor 11 as a vehicle state detection means. When detecting the vehicle speed to be 0 [km/h] based on the vehicle speed signal $S_2$, the controller 12 starts the timer action of the inside timer (time point $T_1$). When the actual vehicle speed is 1 [km/h] or less, the detected vehicle speed (vehicle speed shown in FIG. 2) detected based on the vehicle speed signal $S_2$ is 0 [km/h]. This is because the vehicle speed signal $S_2$ is a pulse signal, so that at the actual vehicle speed of 1 [km/h] or less, the interval of generation of the pulse signal widens, thereby making the detected vehicle speed calculated by the controller 12 zero [km/h].

The controller 12, on the other hand, stops the timer action of the timer and counts the period of time on the timer, i.e. timer time T (from $t_1$ to $t_6$) at the time point $t_6$ where the value of the detected vehicle speed determined based on the vehicle speed signal $S_2$ exceeds 0 again after $t_1$, the time point where the timer action started.

During a set time X (seconds) set beforehand as a third set time beginning at the time point $t_1$, the controller 12 accepts, but does not read, the axle load signal $S_1$. During this set time X (from $t_1$ to $t_2$), the vehicle body vibrates owing to an inertial force generated at the stoppage of the vehicle, whereby the value of the axle load signal $S_1$ fluctuates greatly.

At the time point $t_2$ where the set time X has passed, the controller 11 judges the vehicle to be at a stable standstill in which the fluctuations immediately after the stoppage of the vehicle have been dissolved. During the period of time ranging from $t_2$ to $t_6$, the controller 12 transiently holds the value of the axle load signal $S_1$ in an inside buffer memory or the like.

Between $t_2$ and $t_6$, the load increases at $t_3$ to $t_4$, so that the value of the axle load signal $S_1$ increases during this period.

At $t_5$ to $t_6$, the engine is started to prepare for the start of the vehicle. Thus, the vehicle body vibrates, changing the value of the axle load signal $S_1$.

When the controller 12 detects at $t_6$ the restart of the vehicle on the basis of the output of the vehicle speed sensor 11, the controller 12 judges whether the timer time T (from $t_1$ to $t_6$) is longer than the set timer time $T_0$ ($T_0 \geq X+Y$) that has been set beforehand as the first set time. When the timer time T is longer than the set timer time $T_0$, the value of the axle load signal $S_1$ at the time point $t_5$, the point chronologically backward by the set time Y (second set time) from the time point $t_6$ in the transiently held axle load signal $S_1$, is read, while the values at the other time points are cleared. When the timer time T is shorter than the set timer time $T_0$, all the values of the transiently held axle load signal $S_1$ are cleared.

Based on the read value of the axle load signal $S_1$, the controller 12 adjusts the opening of the control valve 13 as an adjustment means. That is, the axle load signal $S_1$ is always entered in the controller 12. However, only the value of the axle load signal $S_1$ at the time point $t_5$, i.e., the time point where cargo loading or unloading at a standstill of the vehicle has been finished and there are no vibrations due to engine start in preparation for vehicle start, is read into the controller 12. Using only this read value of the axle load signal $S_1$, the controller 12 adjusts the opening of the control valve 13.

During driving, the opening of the control valve 13 is adjusted responsive to vehicle speed, while the value of axle load at $t_5$ is used as such for adjustment of the opening of the control valve 13. Therefore, as vehicle speed increases during driving, the control valve 13 is adjusted so that the assist force decreases. On the other hand, when the value of the axle load signal $S_1$ varies because of vehicle body vibrations generated at the same vehicle speed, the assist force does not change. Consequently, a steering feeling in operating the steering wheel 14 is improved.

Figure 3:
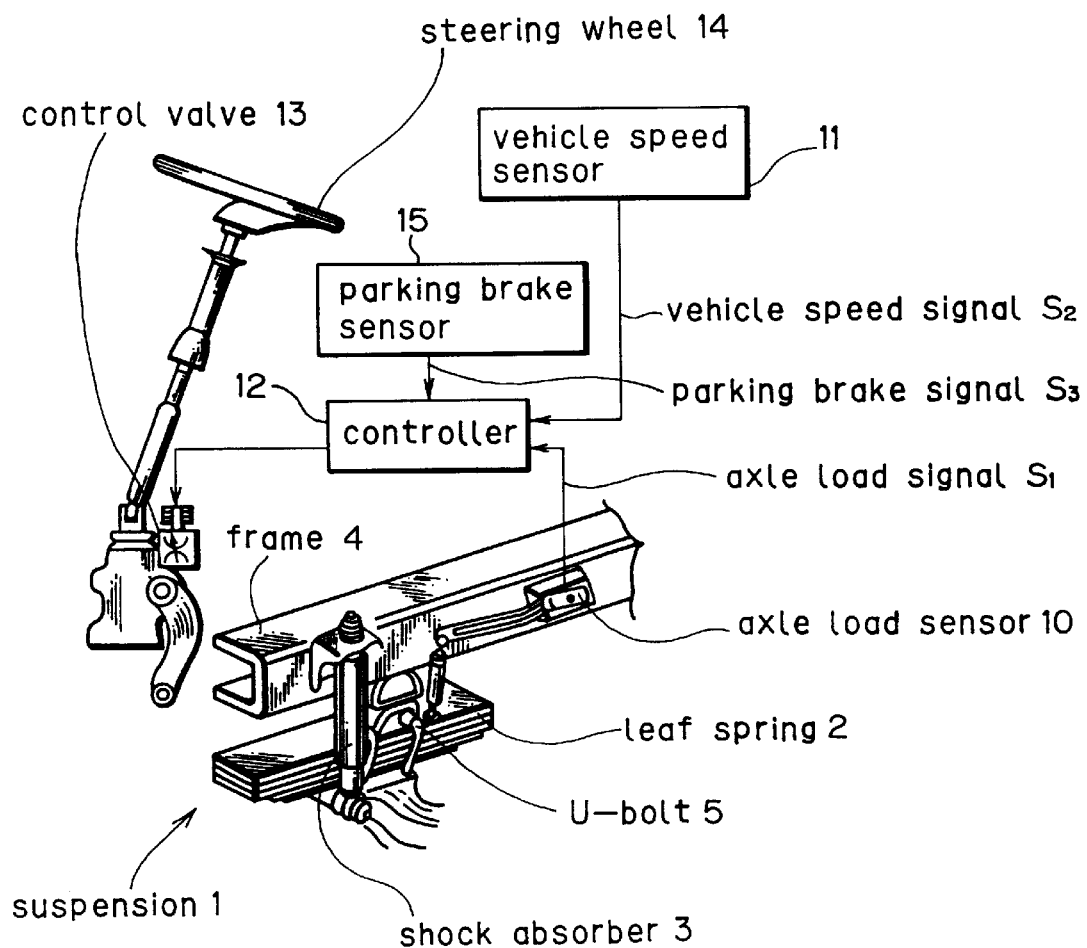
FIG. 3, is a constructional view showing a second embodiment of the present invention.

Next, the second embodiment of the present invention will be described with reference to FIGS. 3 and 4. In the second embodiment, a parking brake sensor 15 is added as a vehicle state detection means as shown in FIG. 3. Upon actuation of the parking brake, a parking brake signal $S_3$ is sent from the parking brake sensor 15 to a controller 12.

In the second embodiment, the start conditions and stop conditions for the timer in the controller 12 are different from those in the first embodiment, but the other actions of the controller 12 are the same as in the first embodiment. The start conditions and stop conditions for the timer in the second embodiment are as follows:

(1) On condition that the detected vehicle speed determined by the vehicle speed signal $S_2$ be 0 [km/h], and that the parking brake signal $S_3$ be produced, the timer is started.

(2) The vehicle is evaluated to have restarted, if at least one of the states (I) and (II) is achieved: (I) The detected vehicle speed determined by the vehicle speed signal $S_2$ exceeds 0 [km/h]. (II) The parking brake signal $S_3$ is no longer entered.

Based on this evaluation, the timer is stopped.

Figure 4:
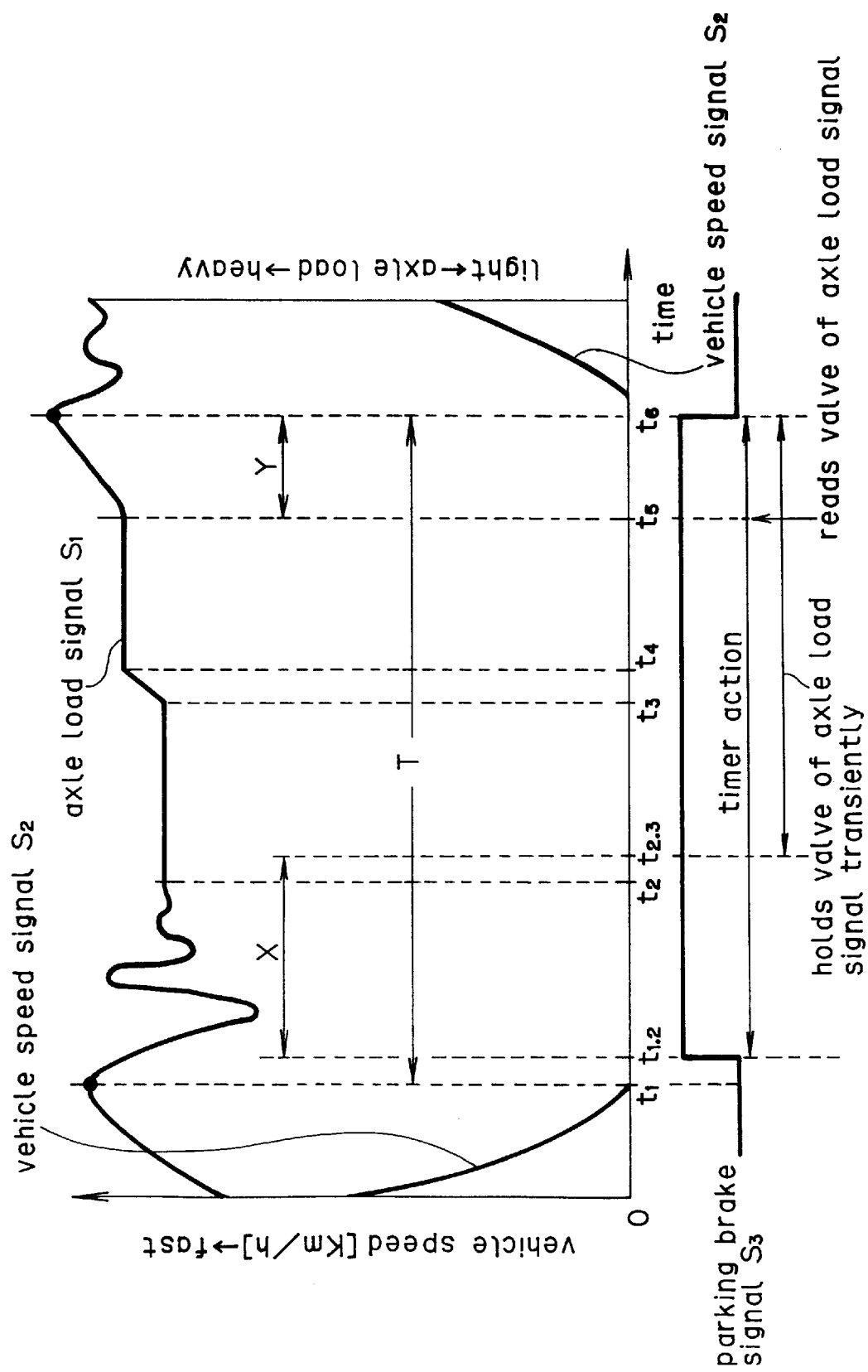
FIG. 4 is an explanatory view showing the state of action of the second embodiment.
Figure 5:
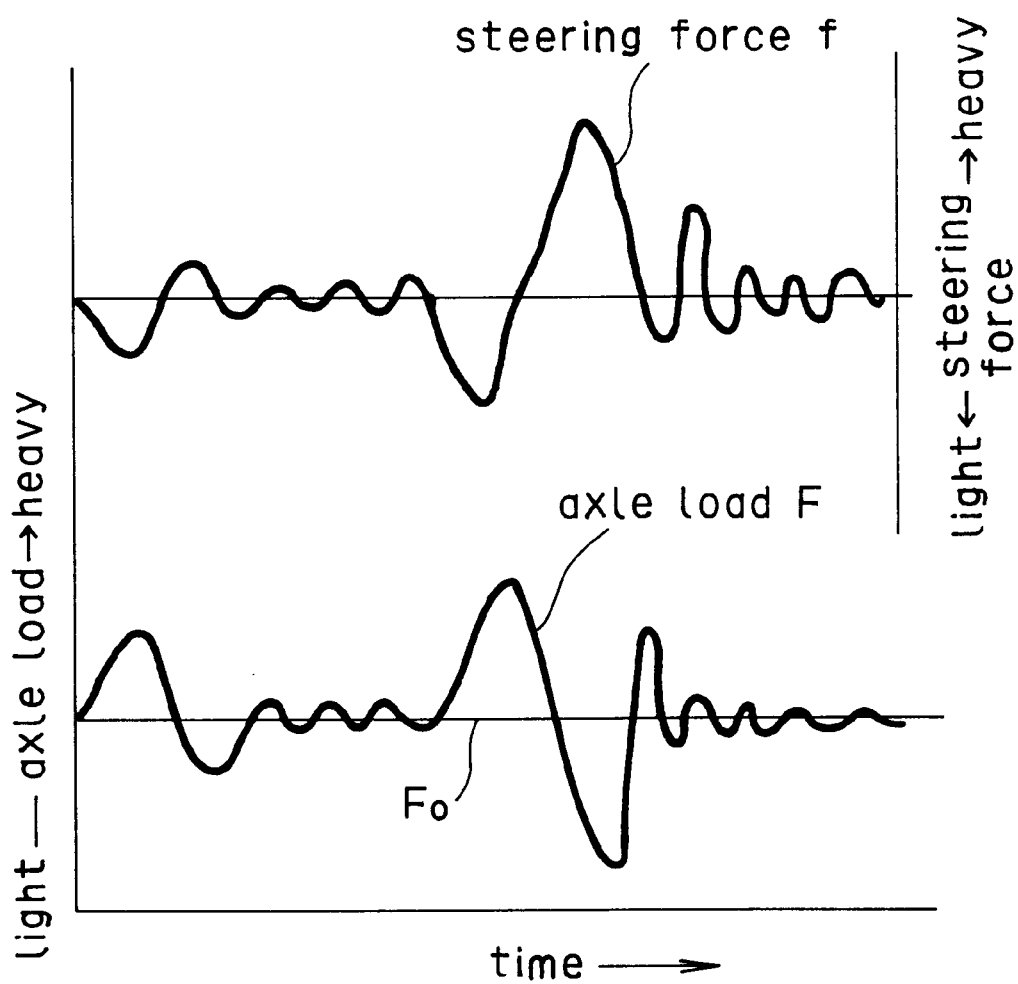
FIG. 5 is a characteristic view showing the relationship between an axle load and a steering force in the prior art.

According to the embodiment of FIG. 4 showing the action of the second embodiment, the conditions of (1) are met at the time point $t_{1,2}$, and the action of the timer starts. The conditions of (2) are satisfied at the time point $t_6$, and the action of the timer stops.

In the second embodiment, the vehicle is evaluated to be at a stable standstill at the time point $t_{2,3}$, the point where the set time X has passed since the time point $t_{1,2}$, the point where the timer action started. From this time point $t_{2,3}$ onwards, the value of the axle load signal $S_1$ is transiently held. When the timer time T is longer than the set timer time $T_0$ ($T_0 \geq X+Y$), the value of the axle load signal $S_1$ at the time point $t_5$, the point chronologically backward by the set time Y from the time point $t_6$, the point where the timer action stopped, is read. Based on the read value of the axle load signal $S_1$, the opening of the control valve 13 is adjusted.

The foregoing set times X, Y and the set timer time $T_0$ have been set by programs. However, learning function may be added so that the set values can be automatically changed in response to the state of the vehicle.

As the axle load sensor, a potentiometer, a rotary encoder, a differential transducer, an ultrasonic sensor, or a strain gauge may be used in addition to the types shown in FIGS. 1 and 3.

In the above respective embodiments, the axle load signal $S_1$ from the stable standstill until the restart of the vehicle is held. However, the detected signal until the set time Y prior to the latest value may be held.

INDUSTRIAL APPLICABILITY

As has been concretely described along with the embodiments, the present invention can adjust the steering assist force responsive only to load attributed to changes in cargo, when the vehicle is at a standstill for more than the first set time because of cargo loading or unloading. Thus, even when a vibration occurs in the car body during driving at the same driving speed, the assist force is constant, so that a feeling during steering is improved, and the influence of vibrations immediately before restart can be excluded.

We claim:

1. A vehicle load responsive power steering system, comprising:

load detection means for detecting a grounding load acting on a steering axle;

adjustment means for adjusting a steering assist force of said power steering system; and control means for controlling said adjustment means based upon the grounding load detected by said load detection means;

vehicle state detection means for detecting a state of the vehicle's movement or non-movement; and said control means setting a timer for a first set time and a second set time shorter than the first set time, said control means storing and holding a history of the grounding load during the state of the vehicle's nonmovement, as detected by said vehicle state detection means, said control means retroactively extracting an extracted grounding load from said history to control said adjustment means, the extracted grounding load representing the grounding load at the second set time prior to a start of movement of the vehicle if a state of the vehicle's non-movement has persisted for a duration of at least the first set time.

2. The vehicle load responsive power steering system of claim 1, wherein when said control means senses the start of the vehicle's movement after judging the vehicle to be at a stable standstill in the non-movement state based on the detection output of said vehicle state detection means, said control means controls said adjustment means on the basis of a grounding load detection output present at said second set time prior to the time point of the sensing of the start of the vehicle's movement.

3. The vehicle load responsive power steering system of claim 2, wherein said control means judges the vehicle to be at a stable standstill when sensing that the vehicle is stopping for more than a third set time shorter than said first set time.

4. The vehicle load responsive power steering system of claim 3, wherein said vehicle state detection means is a vehicle speed sensor, and said control means judges the vehicle to be at a stable standstill when the state of zero vehicle speed continues for more than said third set time.

5. The vehicle load responsive power steering system of claim 3, wherein said vehicle state detection means comprises a parking sensor for detecting the state of action of a parking brake, and a vehicle speed sensor, and said control means making a judgment on a stable standstill of the vehicle judges the vehicle to be at a stable standstill when the state of zero vehicle speed and the active state of the parking brake continue for more than said third set time.

6. A method for controlling a power steering system of a vehicle based upon vehicle axle load, the method comprising the steps of:

(a) starting a timer at a begin time when a vehicle speed is less than or equal to a predetermined vehicle speed;

(b) ending the timer at an end time when a vehicle speed exceeds the predetermined speed, the difference between the begin time and the end time representing a first set time;

(c) storing and holding a history of an axle load acting on a steering axle of said vehicle during the first set time;

(d) reading the grounding load from said history at a point retroactively from the end time by a time interval corresponding to a second set time, the second set time being less than the first set time; and being temporally related to the end time such that potential vibrations from starting the vehicle do not bias the determination of the axle load;

(e) setting a steering assist force for the power steering system based on the axle load read from said history.

7. The method according to claim 6 wherein step (e) includes increasing the assist force with increased axle loads.

8. The method according to claim 6 wherein steps (a) and (b) include sensing the vehicle speed.

9. The method according to claim 8 wherein step (e) includes decreasing the assist force with increasing vehicle speed and decreasing axle load.

10. The method according to claim 6 further comprising the step of holding representations of historical values of transient axle load signals sensed in a buffer memory while sensing the axle load in step (c).

11. The method according to claim 6 further comprising the step of waiting to read the axle load until at least after the expiration of a third set time, the third set time containing potential axle load fluctuations from stopping of the vehicle at the begin time.

12. The method according to claim 6 wherein the second set time is selected to generally contain certain potential axle load fluctuations from starting up an engine of the vehicle.

13. The method according to claim 6 wherein the reading of step (d) is accomplished by working chronologically backward from the end time as a reference point, and discarding other historical sensed axle load values at other corresponding time points other than at the second set time.

14. The method according to claim 10 wherein if the first set time is less than a sum of the second set time and the third set time, all representations of historical values of the axle load signal are cleared.

15. The method according to claim 10 wherein step (e) includes adjusting the opening of a control valve of the power steering system.

16. The method according to claim 6 wherein the predetermined speed equals zero.

17. The method according to claim 6 wherein the predetermined speed approximately equals 1 kilometer per hour.

* * * * *